UNITED STATES PATENT OFFICE.

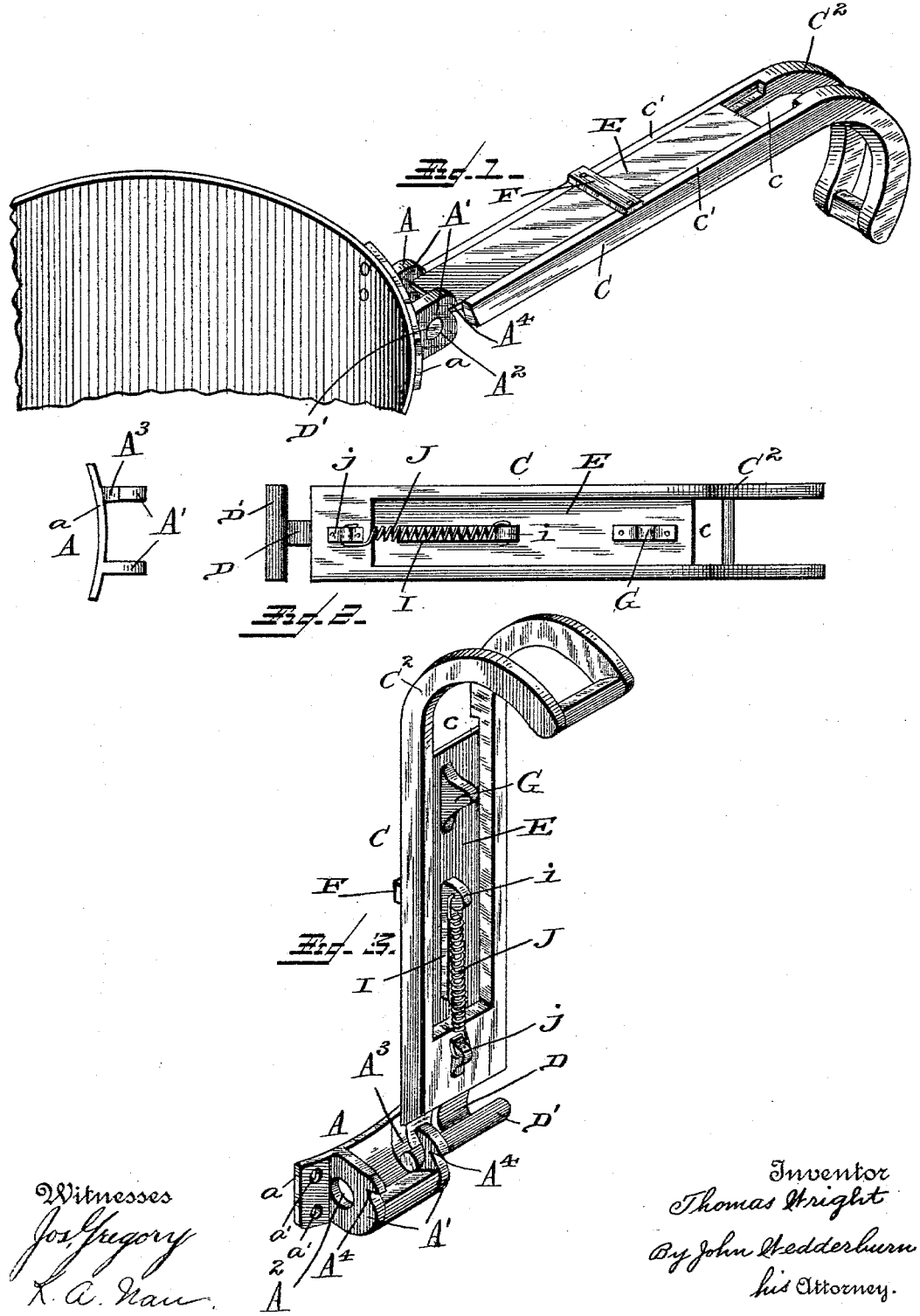

THOMAS WRIGHT, OF EMAUS, PENNSYLVANIA.

DETACHABLE HANDLE FOR PANS.

SPECIFICATION forming part of Letters Patent No. 571,851, dated November 24, 1896.

Application filed February 19, 1896. Serial No. 579,921. (No model.)

*To all whom it may concern:*

Be it known that I, THOMAS WRIGHT, a citizen of the United States, residing at Emaus, in the county of Lehigh and State of Pennsylvania, have invented certain new and useful Improvements in Detachable Handles for Pans; and I do hereby declare the following to be a full, clear, and exact description of the invention, such as will enable others skilled in the art to which it appertains to make and use the same.

This invention relates to certain new and useful improvements in detachable handles for pans and the like to aid in their being removed from the oven or grasped so as to turn the same without the hand coming in contact with the pan, thus avoiding all liability of burning or injury to the hand. I provide a handle having one end bent, by which the pan may be pulled forward, and on the handle I mount a sliding lock adapted to coöperate with a catch or catches on the pan. The handle is readily applied, and when affixed and locked is as rigid as if it were integral with the pan itself.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a perspective view showing the application of the invention. Fig. 2 is a view of the handle and its lock. Fig. 3 is a perspective view showing the handle in its vertical position.

Like letters of reference indicate like parts in the views.

Referring now to the details of the drawings by letter, A designates the catch or coupling, having a base-plate $a$ with openings $a'$ to receive the screws, rivets, or other means by which it is attached to the outer wall of the pan, and this base-plate is formed with the ears $A'$, one of which has an opening $A^2$, while the opening in the other is open at the upper side, as seen at $A^3$. The upper front portions of the ears are formed with the notches $A^4$, adapted to coöperate with the sliding latch on the handle.

The handle consists of the body portion C, slotted longitudinally, as at $c$, and having the guides $c'$ upon opposite sides of the slot. One end of the handle is curved downward, as seen at $C^2$, to form a hook by which the pan may be drawn forward from the oven when desired, and the other end is formed with an extension D, having the cross-bar $D'$, preferably rounded, as shown.

E is a slide mounted to move over the slot in the handle and guided in the guides thereof, a cross-bar or analogous means F being provided to hold the slide in its place and prevent vertical displacement. Upon the under side of the slide at its outer end is a handle or trigger G, while in front of the same is a depending plate I, having a lug $i$, into which is engaged one end of the spring J, the other end being connected with a lug $j$ on the under side of the front cross portion of the handle.

The depending plate on the under side of the slide is adapted to engage the rear wall of the front cross-bar to limit the movement of the slide.

The front end of the slide is beveled, so as to readily engage under the notches of the catch or coupling on the pan.

The operation will be readily understood. The catch or coupling being secured to the pan, as described, the handle is applied by placing the cross-bar of the extension in the open-ended opening in the rear of the catch, holding the handle vertically, and then sliding the same endwise until the said cross-bar engages in the other opening in the other ear, when the portion of the extension between the cross-bar and the main body of the handle can be moved downward between the two ears. The spring then forces the slide down over the inclined face of the notches or hooks on the coupling or catch, and the beveled end of the slide is engaged under the shoulders of the said notches, when the handle will be firmly locked to the pan and the latter can be moved thereby and tipped sidewise or bottom side up to empty it of its contents.

When it is desired to remove the handle from the pan, all that is necessary to do is to pull outward upon the trigger against the tension of the spring until the beveled end of the slide is disengaged from the shoulders of the ears of the catch or coupling, and then by turning the handle in a vertical position and moving it sidewise the cross-bar of the extension is disengaged from the bearings in the ears of the coupling.

Modifications in details may be resorted to without departing from the spirit of the invention or sacrificing any of its advantages.

Having thus described the invention, what is claimed as new is—

1. The combination with the coupling having ears with notches and openings and adapted for attachment to a pan, of the handle having a sliding catch and a hooked end, and a spring acting upon said slide, substantially as described.

2. The combination with the coupling having ears with notches and openings, one of which is open at its upper side, of a handle having an extension with a cross-bar and a sliding catch, substantially as described.

3. The combination with the coupling having ears with notches and openings, one of which is open at its upper side, of a handle having an extension with a cross-bar and a sliding catch, provided with a trigger and with a stop-plate, substantially as described.

4. The combination with a coupling having ears with notches and openings, one of which is open at its upper side, of a handle having an extension with a cross-bar adapted to said openings, the handle being hooked at its other end and a spring-actuated slide for movement lengthwise of the handle and having a beveled end to engage the notches of the coupling, substantially as described.

5. The combination with a coupling having ears with notches and openings, one of which is open at its upper side, of a handle having an extension with a cross-bar adapted to said openings, the handle being hooked at its other end and a spring-actuated slide for movement lengthwise of the handle and having a beveled end to engage the notches of the coupling, and a spring connected with said slide to normally hold it in engagement with said notches, substantially as described.

In testimony whereof I have signed this specification in the presence of two subscribing witnesses.

THOMAS WRIGHT.

Witnesses:
WILSON SMOYER,
JACOB S. WOLFE.